(12) United States Patent
Hsu et al.

(10) Patent No.: US 10,301,845 B2
(45) Date of Patent: May 28, 2019

(54) ELECTRONIC SYSTEM WITH LOCKING FUNCTION BY ELECTRONICALLY CONTROLLED

(71) Applicants: Yuan-An Hsu, Taipei (TW); San-Feng Lin, Taipei (TW); Mei-Fang Chou, Taipei (TW); Wei-Cheng Kao, Taipei (TW); Jia-Hong Lu, Taipei (TW); Chong-Xian Wu, Taipei (TW)

(72) Inventors: Yuan-An Hsu, Taipei (TW); San-Feng Lin, Taipei (TW); Mei-Fang Chou, Taipei (TW); Wei-Cheng Kao, Taipei (TW); Jia-Hong Lu, Taipei (TW); Chong-Xian Wu, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 827 days.

(21) Appl. No.: 14/275,843

(22) Filed: May 12, 2014

(65) Prior Publication Data

US 2014/0338408 A1 Nov. 20, 2014

Related U.S. Application Data

(60) Provisional application No. 61/823,358, filed on May 14, 2013.

(30) Foreign Application Priority Data

Jan. 24, 2014 (TW) .............................. 103102713 A

(51) Int. Cl.
*E05B 47/00* (2006.01)
*E05B 47/02* (2006.01)
(Continued)

(52) U.S. Cl.
CPC ........ *E05B 47/0001* (2013.01); *E05B 47/023* (2013.01); *E05B 2073/0088* (2013.01);
(Continued)

(58) Field of Classification Search
CPC .... E05B 65/0067; E05B 15/04; E05B 15/101; E05B 17/0037; E05B 63/20;
(Continued)

(56) References Cited

U.S. PATENT DOCUMENTS

| 971,423 | A | * | 9/1910 | Walters | .................... E05B 81/20 |
| | | | | | 292/201 |
| 1,417,430 | A | * | 5/1922 | Tulloch | ............... E05B 47/0002 |
| | | | | | 292/201 |

(Continued)

FOREIGN PATENT DOCUMENTS

| CA | 2292593 A1 * | 8/1999 | ......... E05B 47/0002 |
| CN | 201048201 | 4/2008 | |

(Continued)

*Primary Examiner* — Christine M Mills
(74) *Attorney, Agent, or Firm* — JCIPRNET

(57) ABSTRACT

An electronic system with an electronically controlled electronic locking mechanism is provided. The system includes a first electronic device having a first part, a first fastening element, a second part, and an electronic locking element. The first fastening element is pivotally connected to the first part and rotates relatively to the first part. The second part includes a fastening portion. The electronic locking element is disposed at the first part, electronically connected to the first electronic device, and connected to the first fastening element. When the fastening portion of the second part contacts and fastens to the first fastening element of the first part, the first electronic device supplies power to the electronic locking element, and thus the electronic locking element fixes the first fastening element to lock the first part and the second part together.

11 Claims, 3 Drawing Sheets

(51) Int. Cl.
  *E05B 73/00* (2006.01)
  *G06F 1/16* (2006.01)
(52) U.S. Cl.
  CPC .......... *G06F 1/1632* (2013.01); *G06F 1/1679* (2013.01); *Y10T 70/7051* (2015.04)
(58) Field of Classification Search
  CPC ............... E05B 63/202; E05B 47/0001; E05B 47/0002; E05B 73/0082; E05B 2073/0088; E05C 1/085; G06F 1/1679; G06F 1/186; H05K 5/0021; H05K 7/1401; Y10T 292/096; Y10T 292/1014; Y10T 292/102; Y10T 292/0969; Y10T 292/097; Y10T 292/0977; Y10T 292/696; Y10T 292/699; Y10T 292/0095; Y10T 292/0997; Y10T 292/0995
  USPC ....... 292/163, 164, 169, 174, 175, 137, 138, 292/143, 341.15, 341.16; 361/679.57, 361/679.58
  See application file for complete search history.

(56) References Cited

U.S. PATENT DOCUMENTS

| | | | | | |
|---|---|---|---|---|---|
| 2,174,969 | A | * | 10/1939 | Collings | E05B 47/0002 74/2 |
| 2,224,671 | A | * | 12/1940 | Crooks | E05B 47/0002 292/25 |
| 3,122,388 | A | * | 2/1964 | Powers | E05B 47/0047 292/201 |
| 3,312,492 | A | * | 4/1967 | Remhof | E05C 19/16 292/201 |
| 3,758,142 | A | * | 9/1973 | Gartner | E05B 47/0696 292/254 |
| 4,101,745 | A | * | 7/1978 | Smith | E05B 47/0002 200/61.61 |
| 4,351,288 | A | * | 9/1982 | Gasloli | F24C 15/022 126/192 |
| 4,586,761 | A | * | 5/1986 | Shimbara | G11B 15/67507 312/311 |
| 4,613,176 | A | * | 9/1986 | Kelly | E05B 47/0002 292/201 |
| 4,659,884 | A | * | 4/1987 | Wollenhaupt | E05B 47/0002 200/50.01 |
| 4,720,611 | A | * | 1/1988 | Ishii | E05B 47/0002 200/61.61 |
| 5,306,174 | A | * | 4/1994 | Kiga | H01R 13/639 348/E5.026 |
| 5,492,382 | A | * | 2/1996 | McBride | E05B 47/0002 292/201 |
| 5,690,373 | A | * | 11/1997 | Luker | E05B 47/0607 292/144 |
| 6,027,148 | A | * | 2/2000 | Shoemaker | E05B 47/0002 292/201 |
| 7,679,899 | B2 | * | 3/2010 | Hsieh | G06F 1/1616 361/679.38 |
| 7,817,414 | B2 | * | 10/2010 | Chou | G06F 1/1632 361/679.41 |
| 9,223,356 | B2 | * | 12/2015 | Chuang | G06F 1/1626 |
| 9,255,425 | B2 | * | 2/2016 | Wittke | E05B 17/0029 |
| 2010/0139338 | A1 | * | 6/2010 | Wintersteiger | E05B 47/0696 70/78 |
| 2011/0116862 | A1 | * | 5/2011 | Lo | E05B 73/0082 403/326 |

FOREIGN PATENT DOCUMENTS

| | | | | |
|---|---|---|---|---|
| CN | 101950193 | | 1/2011 | |
| CN | 202003364 | | 10/2011 | |
| EP | 0811738 | A1 * | 12/1997 | ............. E05B 47/00 |
| EP | 0838567 | A1 * | 4/1998 | ......... E05B 47/0002 |
| EP | 2463460 | A2 * | 6/2012 | ......... E05B 47/0607 |
| FR | 2624904 | A1 * | 6/1989 | ......... E05B 47/0696 |
| FR | 2687718 | A1 * | 8/1993 | ......... E05B 17/0037 |
| FR | 2738864 | A1 * | 3/1997 | ........... A44B 19/301 |
| FR | 2749343 | A1 * | 12/1997 | ........ E05B 17/0037 |

* cited by examiner

ELECTRONIC SYSTEM WITH LOCKING FUNCTION BY ELECTRONICALLY CONTROLLED

CROSS-REFERENCE TO RELATED APPLICATION

This application claims the priority benefit of U.S. provisional application Ser. No. 61/823,358, filed on May 14, 2013, and Taiwan application serial No. 103102713, filed on Jan. 24, 2014. The entirety of each of the above-mentioned patent applications is hereby incorporated by reference herein and made a part of specification.

BACKGROUND OF THE INVENTION

Field of the Invention

The invention relates to an electronic system and, more particularly, to a portable electronic system.

Description of the Related Art

Varies mechanical components such as gears, racks, pushing elements, fastening elements, are usually used to assemble and lock separate parts together. However, the accuracy requirements on the dimensional and the connection of the mechanical components are critical. Moreover, the connection effect may be lower day by day due to the high frequency moving friction between the mechanical components, and it's very easy to be detached accidently from each other. Additionally, the friction occurs between mechanical components also shortens the service life of the mechanical components.

BRIEF SUMMARY OF THE INVENTION

An electronic system with an electronically controlled electronic locking mechanism is provided, it includes a first electronic device including a first part, a first fastening element, a second part, and an electronic locking element. The first fastening element is pivotally connected to the first part and rotates relative to the first part. The second part includes a fastening portion. The electronic locking element is disposed at the first part, electronically connected to the first electronic device, and connected to the first fastening element. When the fastening portion of the second part contacts and is fastened to the first fastening element of the first part, the first electronic device supplies power to the electronic locking element, and thus the electronic locking element fixes the first fastening element to lock the first part and the second part together.

An electronic system with an electronically controlled electronic locking mechanism is provided, it includes a first electronic device including a first part, a fastening member, a first spring, a second part, a first pushing element, a second spring, an electronic locking element, and a second pushing element. The fastening member is disposed at the first part and adapted to move relatively to the first part. One end of the first spring is connected to the first part, and the other end of the first spring is connected to the fastening member. The second part includes a fastening portion, and the first pushing element is disposed at the first part, and interferes with the first fastening element. One end of the second spring is connected to the first part, the other end of the second spring is connected to the first pushing element. The electronic locking element is disposed at the first part and electronically connected to the first electronic device. The second pushing element is disposed at the first part and located between the electronic locking element and the fastening member. When the second part of the fastening portion contacts and fastens to the hook portion of the first part, the first electronic device supplies power to the electronic locking element, the electronic locking element fixes the fastening member to lock the first part and the second part together.

In sum, according to the description in the electronic system with an electronically controlled electronic locking mechanism in embodiments, via the electronic locking element, whether the first electronic device supplies power to the electronic locking element can determine whether the state between the first part and the second part is a limiting state or a releasing state.

These and other features, aspects and advantages of the present invention will become better understood with regard to the following description, appended claims, and accompanying drawings.

DETAILED DESCRIPTION OF THE EMBODIMENTS

Figure 1:
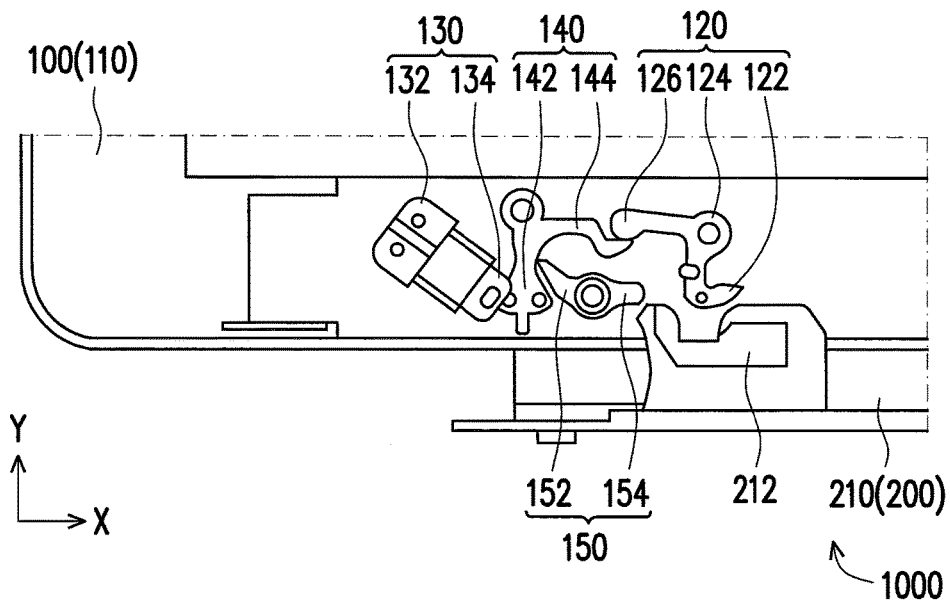
FIG. 1 is a schematic diagram showing that an electronic system with an electronically controlled electronic locking mechanism is at a releasing state in a first embodiment.

FIG. 1 is a schematic diagram showing that an electronic system with an electronically controlled electronic locking mechanism is at a releasing state in a first embodiment. As shown in FIG. 1, the electronic system 1000 with an electronically controlled electronic locking mechanism includes a first electronic device 100 with a first part 110, a first fastening element 120, a second part 210, and an electronic locking element 130. In the embodiment, the first part 110 is a housing of the first electronic device 100, and the first electronic device 100 may be a tablet computer, the second part 210 may be a housing of a peripheral component 200, the peripheral device 200 may be a second electronic device, such as a docking station of the tablet computer or a base of a keyboard which can be electronically connected and exchange data with the first electronic device 100, the peripheral device 200 also may be not the electronic devices according to practical requirements. The first electronic device 100, the peripheral device 200, the first part 110, or the second part 210 are just examples, which is not limited herein, persons skilled in the art can make changes according to requirements.

The first fastening element 120 is pivotally connected to the first part 110, and it is adapted to rotate relative to the first part 110. As shown in FIG. 1, the first fastening element 120 includes a hook portion 122, a pivoting portion 124 and a first end 126. The hook portion 122 is used to be fastened to a fastening portion 212 of the second part 210. The fastening portion 212 may be a recess. The pivoting portion 124 may be an opening, a fixing member such as a tenon is used to pass through the opening and then pass into the first part 110, so as to make the first fastening element 120 pivotally connected to the first part 110 via the pivoting portion 124, and the first fastening element 120 can rotate relative to the first part 110. The pivoting portion 124, the hook portion 122, and the first end 126 extend from the pivoting portion 124 along the radial of the pivoting portion 124. The angle between the hook portion 122 and the first end 126 is approximately a right angle, which is not limited herein. In the embodiment, the direction of the part of the hook portion 122 for being fastened to the fastening portion 212 of the second part 210 is approximately parallel to the extending direction of the first end 126.

The electronic locking element 130 is disposed at the first part 110, and it is electronically connected to a CPU (not shown) of the first electronic device 100. The electronic locking element 130 includes a body 132 and a protrusion part 134, the body 132 is fixed to the first part 110, the protrusion part 134 passes through the body 132 and protrudes from the body 132. The electronic locking element 130 does not fix the first fastening element 120 at the unlocking state (the electronic locking element 130 is not powered on) and allows the first electronic device 100 detached from the peripheral device 200, or the electronic locking element 130 fixes the first fastening element 120 in the locking state (the electronic locking element 130 is not powered on) to make the first electronic device 100 fastened to the peripheral device 200, and the first electronic device 100 and the peripheral device 200 cannot be separated.

In the embodiment, a second fastening element 140 and a third fastening element 150 are disposed between the first fastening element 120 and the electronic locking element 130. The second fastening element 140 and the third fastening element 150 may be pivotally connected to the first part 110 in the same manner as the first fastening element 120. Simply speaking, the second fastening element 140 includes a second end 142 and a third end 144, the extending direction of the second end 142 is approximately perpendicular to that of the third end 144, which is not limited herein. The second end 142 of the second fastening element 140 is adjacent to the electronic locking element 130, and the third end 144 of the second fastening element 140 contacts the first end 126 of the first fastening element 120. The third fastening element 150 includes a fourth end 152 and a fifth end 154, and the fourth end 152 and the fifth end 154 are approximately at the same horizontal line and extend towards different directions. The shape of the third fastening element 150 is not limited herein, and the angle between the fourth end 152 and the fifth end 154 can be changed according to requirements. The fourth end 152 of the third fastening element 150 contacts the second end 142 of the second fastening element 140, and the fifth end 154 of the third fastening element 150 is at the opposite side of the fourth end 152.

Figure 2:
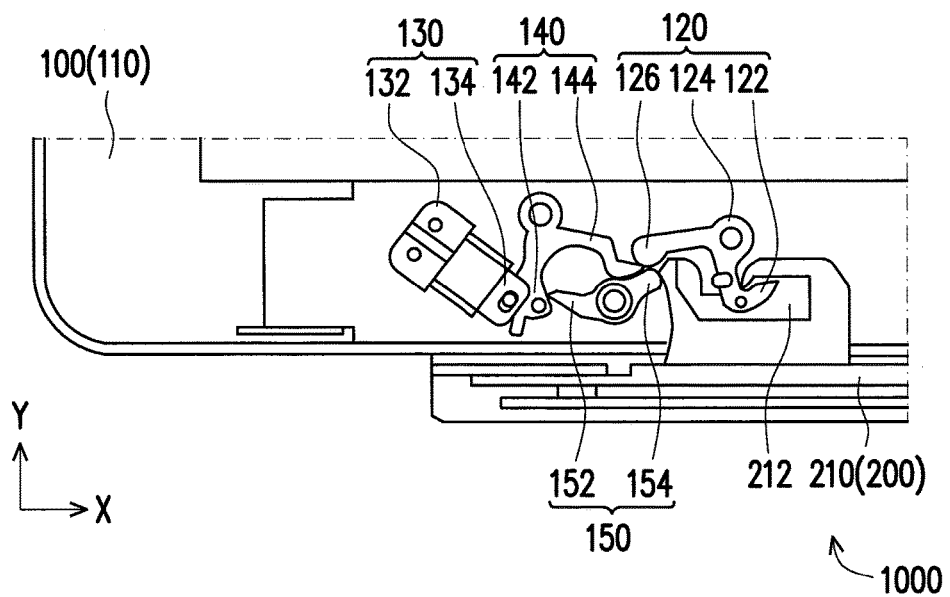
FIG. 2 is a schematic diagram showing that an electronic system with an electronically controlled electronic locking mechanism is at the limiting state in a first embodiment.

FIG. 2 is a schematic diagram showing that an electronic system with an electronically controlled electronic locking mechanism is at the limiting state in a first embodiment. As shown in FIG. 1 and FIG. 2, when the second part 210 is connected to the first part 110 along the direction Y, the edge of the fastening portion 212 (which is relatively near the hook portion 122 of the first fastening element 120) of the second part 210 first contacts the hook portion 122 of the first fastening element 120, and then it drives the first fastening element 120 to rotates with the pivoting portion 124 as the center, meanwhile, since the first end 126 of the first fastening element 120 contacts the third end 144 of the second fastening element 140, therefore drives the second fastening element 140 to rotate to make the second end 142 of the second fastening element 140 much closer to the electronic locking element 130.

In the process of that the second part 210 is connected to the first part 110 along the direction Y, with the move of the second part 210 towards the direction Y, the other edge of the fastening portion 212 (this edge is at a side opposite to the edge of the fastening portion 212 of the second part 210 which is relatively closer to the hook portion 122 of the first fastening element 120) would be against and press the fifth end 154 of the third fastening element 150, and then makes the third fastening element 150 rotate, and thus the fourth end 152 of the third fastening element 150 pushes the second end 142 of the second fastening element 140 to make the second end 142 much closer to the electronic locking element 130.

At the moment, it can control the first electronic device 100 to supply power to the electronic locking element 130 via software or a sensor, or manually (such as a button or a switch), and the electronic locking element 130 and the second end 142 of the second fastening element 140 limits each other, and then the position and the state of the first fastening element 120 are fixed, and thus first electronic device 100 and the peripheral device 200 fix to each other and cannot be separated. Moreover, the electronic locking element 130 may be an electromagnet which have magnetic after powered, and a permanent magnet also may be disposed at the second end 142, or the second end 142 have magnetic. Consequently, when the first electronic device 100 supplies power to the electronic locking element 130, the protrusion part 134 of the electronic locking element 130 and the second end 142 attracts to each other, with the relation and the restrict among the third fastening element 150, the second fastening element 140, and the first fastening element 120, the position and the state of the first fastening element 120 are fixed.

In another embodiment of the electronic locking element 130, an electromagnet also can be disposed in the body 132, and the length of the protrusion part 134 protruding from the body 132 is changed under controlled by the electromagnet. For example, the length of the protrusion part 134 protruding from the body 132 before powered is smaller than that after powered. With corresponding structures at the protrusion part 134 and the second end 142, the protrusion part 134 and the second end 142 can be fastened to each other. In an embodiment, the electronic locking element 130 also may be a motor.

To detach the peripheral device 200 from the first electronic device 100, it should wait until the first electronic device 100 does not supply power to the electronic locking element 130, the limitation between the electronic locking element 130 and the second end 142 of the second fastening element 140 is released, and then the space is generated for the rotating of the first fastening element 120, the second fastening element 140, and the third fastening element 150, and then it allows the peripheral device 200 to be detached from the first electronic device 100. The first electronic device 100 does not supply power to the electronic locking element 130 may include the following situations, the first electronic device 100 is powered off and the first electronic device 100 and the peripheral device 200 have no data transmission there between. That the first electronic device 100 does not supply power to the electronic locking element 130 can be controlled manually (such as via a switch or a key) or via software.

In the embodiment that the protrusion part 134 can move relative to the body, the second fastening element 140 is driven to rotate to get the limiting state or release the limiting state via the push or the retraction of the protrusion part. Furthermore, a spring (not shown) may be disposed at the first part 110 to driven the first fastening element 120, the second fastening element 140 and/or the third fastening element 150 to restore the original position via the restoring force of the spring. The number and the position of the spring can be changed according to practical requirements. For example, only one spring is disposed, and the spring is connected to the first end 126 of the first fastening element 120, or the spring is connected to the third end 144 of the second fastening element 140. There also may be two or more springs, and the springs are connected to two of the first fastening element 120, the second fastening element 140, and the third fastening element 150. The man skilled in the art can change the position of the spring and the corresponding fastening member connected to the spring according to embodiments.

The number, the shape, the disposing mode, and the type of the fastening member can be changed according to practical requirements. In an embodiment, the electronic locking element 130 can be disposed adjacent to the first fastening element 120, and no other components are disposed between the electronic locking element 130 and the first fastening element 120. When the electronic locking element 130 is powered on, the electronic locking element 130 directly contacts the first fastening element 120 and limits the first fastening element 120. With this arrangement, the space for electronic control locking components is reduced, and the available space for the mechanical components or electronic locking elements of other electronic devices is increased, or the size of the electronic device is reduced.

Figure 3:
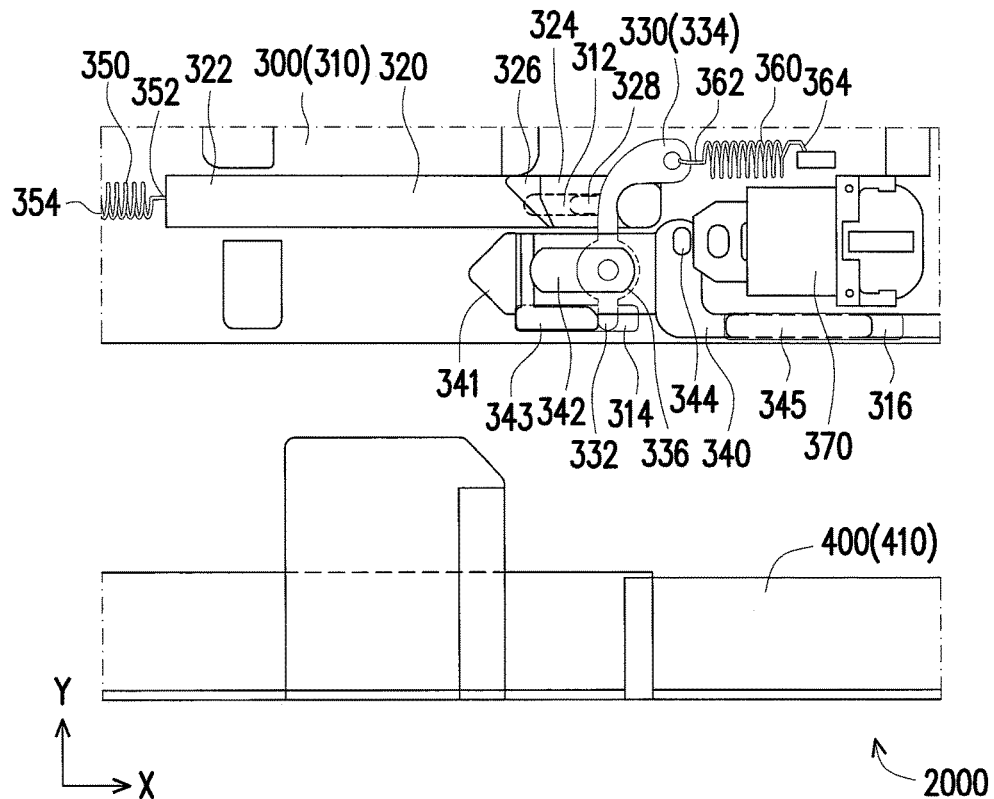
FIG. 3 is a schematic diagram showing that an electronic system with an electronically controlled electronic locking mechanism is at a releasing state before the limiting in a second embodiment.

FIG. 3 is a schematic diagram showing that an electronic system with an electronically controlled electronic locking mechanism is at a releasing state before the limiting in a second embodiment. As shown in FIG. 3, the electronic system 2000 with an electronically controlled electronic locking mechanism includes a first electronic device 300 of a first part 310, a fastening member 320, a first pushing element 330, a second pushing element 340, a first spring 350, a second spring 360, an electronic locking element 370, and a second part 410 of a fastening portion 412. Different from the above embodiment, the first part 310 in the embodiment is the housing of the first electronic device 300, the second part 410 may be a housing of the peripheral device 400, and the peripheral device 400 may be a second electronic device, such as a docking station of a tablet computer or a keyboard docking which can be electronically connected to the first electronic device 300 to transmit data, and it also may be not an electronic device.

In detail, all the fastening member 320, the first pushing element 330, the second pushing element 340, and the electronic locking element 370 are disposed at the first part 310, the fastening member 320 and the second pushing element 340 moves back and forth relative to the first part 310 along the direction X, and the first pushing element 330 is pivotally connected to the first part 310 and rotates relative to the first part 310.

The fastening member 320 may be bar shaped or rod shaped, and it includes a first end 322 and a second end 324, the first end 322 is connected to an end 352 of the first spring 350, the other end 354 of the first spring 350 is fixed to the first part 310. The second end 324 of the fastening member 320 interferes with the first pushing element 330. In the embodiment, the second end 324 may be a hook hooked to the first pushing element 330. The fastening member 320 further includes a hook portion 326, and the hook portion 326 is used to hooked to the fastening portion 412 of the second part 410. In the embodiment, the fastening portion 412 of the second part 410 is a hook. Moreover, the first part 310 includes a first guiding slot 312, and the length direction of the first guiding slot 312 is parallel to the direction X. The fastening member 320 includes a first protrusion block 328 corresponding disposed at the first guiding slot 312, via the cooperation of the first protrusion block 328 and the first guiding slot 312, the fastening member 320 can stably move back and forth along the direction.

The first part 310 pivotally connected to the first pushing element 330 includes a third end 332 and a fourth end 334, and the third end 332 and the fourth end 334 extend towards opposite directions along the direction Y, which is not limited herein. One end 362 of the second spring 360 of the electronic system 2000 with an electronically controlled electronic locking mechanism is connected with the fourth end 334, and the other end 364 of the second spring 360 is fixed at the first part 310, with the restoring force of the second spring 360, the first pushing element 330 can restore the original position. The second end 324 of the fastening member 320 is hooked to the fourth end 334 of the first pushing element 330.

The second pushing element 340 includes a guiding portion 341, a pivoting portion 342, a second protrusion block 343, a limiting portion 344, and a third protrusion block 345. The first part 310 further includes the second guiding slot 314 and the third guiding slot 316, and the length direction of the second guiding slot 314 and the third guiding slot 316 is parallel to the direction X. The second protrusion block 343 is correspondingly disposed at the second guiding slot 314 and abuts against the third end 332 of the first pushing element 330, and the third protrusion block 345 is correspondingly disposed at the third guiding slot 316. The guiding portion 341 is at the front of the second pushing element 340, when the fastening portion 412 of the second part 410 enters into the first part 310, the fastening portion 412 pushes the guiding portion 341 to move, so as to drive the first pushing element 330 to rotate. The pivoting portion 342 is disposed corresponding to the pivoting connecting portion 336 of the first pushing element 330. The pivoting portion 342 may be a recess, and a part of the pivoting connecting portion 336 is corresponding to the recess. Via the corresponding arrangement of the second protrusion block 343, the third protrusion block 345, the pivoting connecting portion 336, the second guiding slot 314, the third guiding slot 316, and the pivoting portion 342, the second pushing element 340 can move stably along the direction X, and it does not easily shift. The guiding portion 341 and the limiting portion 344 are at two opposite sides of the pivoting portion 342, and the limiting portion 344 is adjacent to the electronic locking element 370.

The electronic locking element 370 is fixed at the first part 310 to fix the second pushing element 340, and then restricts the position and the state of the first pushing element 330, so as to ensure that the fastening member 320 of the first part 310 is fastened to the fastening portion 412 of the second part 410 to make the first electronic device 300 firmly combined with the peripheral device 400.

Figure 4:
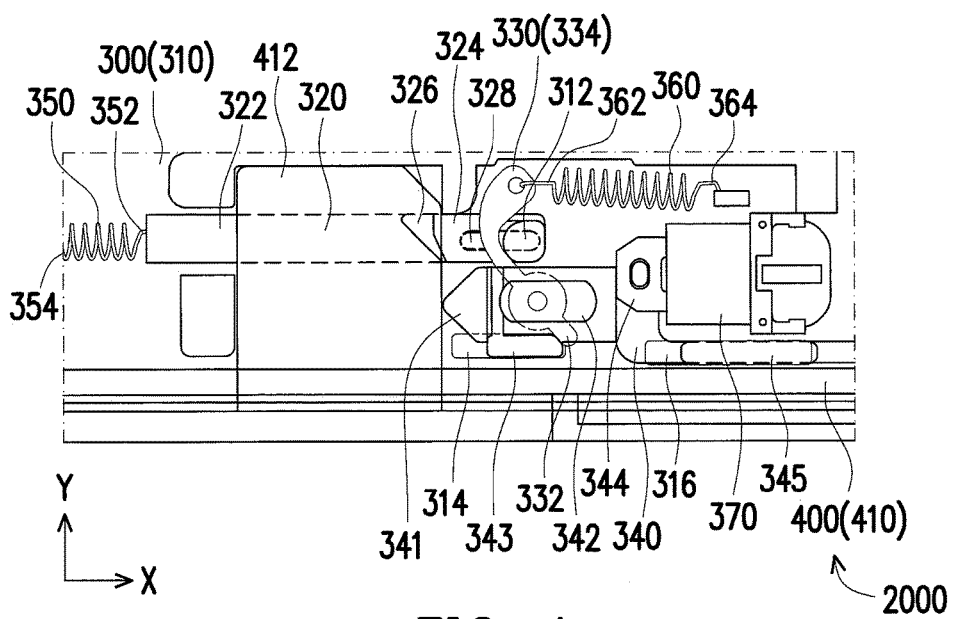
FIG. 4 is a schematic diagram showing that an electronic system with an electronically controlled electronic locking mechanism is at the limiting state in a second embodiment.

FIG. 4 is a schematic diagram showing that an electronic system with an electronically controlled electronic locking mechanism is at the limiting state in a second embodiment. As shown in FIG. 3 and FIG. 4, when the fastening portion 412 of the second part 410 of the peripheral device 400 moves along the direction Y to combined with the first electronic device 300, the fastening portion 412 first contacts the guiding portion 341 which is at the front of the second pushing element 340. With the continuous move of the second part 410 of the peripheral device 400, the second pushing element 340 is pushed to move towards the direction X, meanwhile, the second protrusion block 343 pushes the third end 332 of the first pushing element 330 to make the first pushing element 330 rotate, and the fourth end 334 of the first pushing element 330 moves along the reverse of the direction X, so as to make that the fastening member 320 which is fastened to the fourth end 334 of the first pushing element 330 moves along the reverse of the direction X due to the restoring force of the first spring 350, and then it is fastened to the fastening portion 412 of the second part 410 of the peripheral device 400.

At the time, the first electronic device 300 supplies power to the electronic locking element 370, and the electronic locking element 370 restricts the limiting portion 344, and thus the position and the state of the second pushing element 340 at the first part 310 is fixed, so as to make that the position and the state of the first pushing element 330 and the fastening member 320 at the first part 310 is fixed. Consequently, the fastening member 320 and the fastening portion 412 can be fastened stably, and the peripheral device 400 cannot be detached from the first electronic device 300. The operation of the electronic locking element 370 is illustrated above, which is not described again for a concise purpose.

Figure 5:
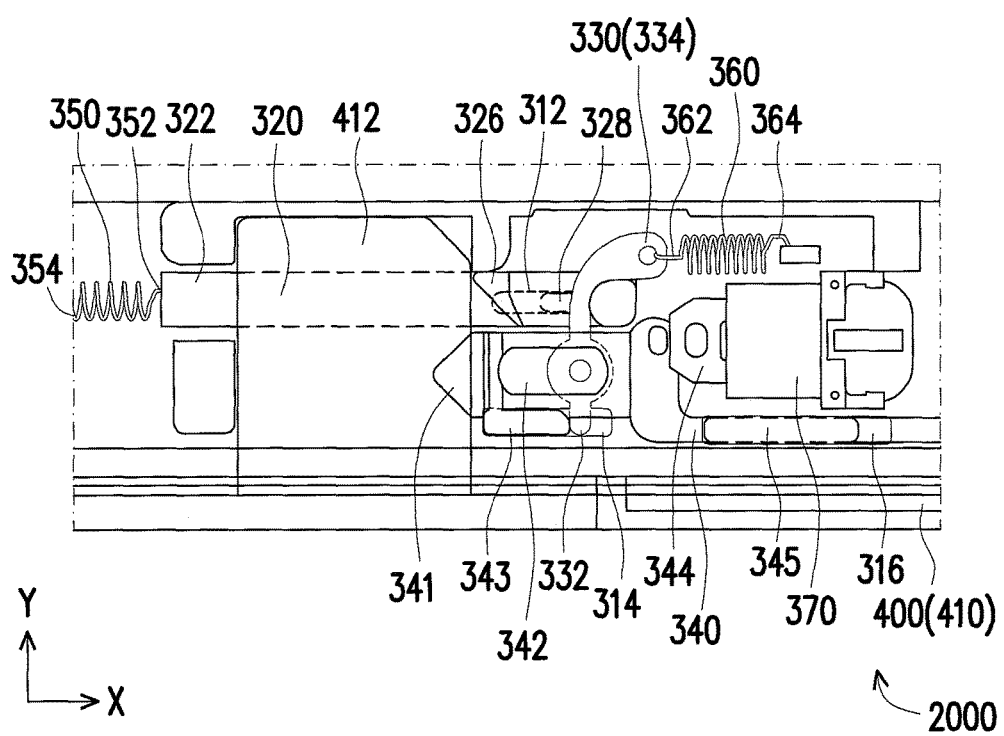
FIG. 5 is a schematic diagram showing that an electronic system with an electronically controlled electronic locking mechanism is at the releasing state after the limiting in a second embodiment.

FIG. 5 is a schematic diagram showing that an electronic system with an electronically controlled electronic locking mechanism is at the releasing state after the limiting in a second embodiment. When to detach the peripheral device 400 from the first electronic device 300, the first electronic device 300 stops to supply power to the electronic locking element 370, and then the limiting state between the electronic locking element 370 and the limiting portion 344 of the second pushing element 340 is released, via the restoring force of the spring, the first pushing element 330 is drive to rotate to the original position, and the fastening member 320 also moves to the original position, the limiting state between the hook portion 326 of the fastening member 320 and the fastening portion 412 of the second part 410 is released, and then the second part 410 can be removed from the first electronic device 300.

The style, the number, and the disposing mode of the fastening member and/or the spring in embodiments can be changed according to practical requirements, which is not limited herein.

In conclusion, in the electronic system with an electronically controlled electronic locking mechanism in embodiments, the electronic device supplies power to the electronic locking element, and the power to the electronic locking element is used for the stable combination between the electronic device and the other electronic devices or un-electronic devices. Conventionally, only the co-movement relation among the mechanical components are used to achieve the limiting state or release the limiting state, and thus the requirement on the dimensional accuracy of the mechanical components and the connection precision between mechanical components is high, moreover, the connection effect among the mechanical components may become poor due to the friction. In contrast, via the electronic locking element, the electronic system with an electronically controlled electronic locking mechanism in embodiments not only can reduce the number of the mechanical components, but also have lower requirement on the dimensional accuracy of the mechanical components and the connection precision of the mechanical component, and the service life of the mechanical components also can be further prolonged.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. An electronic system, comprising:
an electronic device including a first part and a power source;
a fastening member disposed at the first part and adapted to move relative to the first part;
a first spring, wherein a first end of the first spring is connected to the first part, and a second end of the first spring is connected to the fastening member;
a second part including a fastening portion;
a first pushing element disposed at the first part and interfering with the fastening member;
a second spring, a first end of the second spring is connected to the first part, and a second end of the second spring is connected to the first pushing element;
an electronic locking element disposed at the first part and electronically connected to the electronic device, wherein the power source is operatively connected to the electronic locking element; and
a second pushing element disposed at the first part and located between the electronic locking element and the fastening member;
wherein when the fastening portion of the second part contacts the fastening member and is fastened, the electronic device supplies power to the electronic locking element, and the electronic locking element restricts a position of the first pushing element to fix the fastening member to the fastening portion of the second part so as to lock the first part and the second part together, wherein the first pushing element is driven by a restoring force of the second spring to rotate away from the fastening portion of the second part to unlock the first part and the second part when the electronic device stops supplying power to the electronic locking element,
wherein the first pushing element includes a pivoting connecting portion pivotally connected to the first part and a pivoting portion of the second pushing element, when the fastening portion of the second part enters into the first part, the fastening portion pushes the second pushing element to drive the first pushing element to rotate towards the fastening portion to fix a position of the fastening member.
2. The electronic system according to claim 1, wherein the first part is a housing of the electronic device.
3. The electronic system according to claim 1, wherein the second part is a housing of a peripheral device.

4. The electronic system according to claim 1, wherein the fastening portion is a hook, the fastening member includes a hook portion, and the hook portion is adapted to be fastened to the fastening portion.

5. The electronic system according to claim 1, wherein the fastening member includes a first end and a second end, wherein the first end is connected to the second end of the first spring, and the second end of the fastening member interferes with the first pushing element.

6. The electronic system according to claim 5, wherein the first pushing element includes a third end and a fourth end, and the second end of the second spring is connected to the fourth end, and the second end of the fastening member is hooked to the fourth end of the first pushing element.

7. The electronic system according to claim 1, wherein the fastening member further includes a first protrusion block, the first part includes a first guiding slot, and the first protrusion block is correspondingly disposed at the first guiding slot.

8. The electronic system according to claim 1, wherein the second pushing element further includes a guiding portion and a limiting portion, the guiding portion is disposed at a side of the second pushing element away from the limiting portion, and the pivoting portion is between the limiting portion and the guiding portion.

9. The electronic system according to claim 1, wherein the second pushing element includes a second protrusion block, the first part includes a second guiding slot, and the second protrusion block is correspondingly disposed in the second guiding slot and abuts against the first pushing element.

10. The electronic system according to claim 1, wherein the second pushing element includes a third protrusion block, the first part includes a third guiding slot, and the third protrusion block is correspondingly disposed in the third guiding slot.

11. An electronic system, comprising:
an electronic device including a first part and a power source;
a fastening member disposed at the first part and adapted to move relative to the first part;
a first spring, wherein a first end of the first spring is connected to the first part, and a second end of the first spring is connected to the fastening member;
a second part including a fastening portion, wherein the second part is a housing of a peripheral electronic device;
a first pushing element disposed at the first part and interfering with the fastening member;
a second spring, a first end of the second spring is connected to the first part, and a second end of the second spring is connected to the first pushing element;
an electronic locking element disposed at the first part and electronically connected to the electronic device, wherein the power source is operatively connected to the electronic locking element; and
a second pushing element disposed at the first part and located between the electronic locking element and the fastening member;
wherein when the fastening portion of the second part contacts the fastening member and is fastened, the electronic device supplies power to the electronic locking element and the electronic locking element fixes the position of the fastening member,
wherein the first pushing element includes a pivoting connecting portion pivotally connected to the first part and a pivoting portion of the second pushing element, when the fastening portion of the second part enters into the first part, the fastening portion pushes the second pushing element to drive the first pushing element to rotate towards the fastening portion to fix a position of the fastening member.

* * * * *